(12) United States Patent
Baarman et al.

(10) Patent No.: US 8,829,731 B2
(45) Date of Patent: Sep. 9, 2014

(54) MAGNETIC POSITIONING FOR INDUCTIVE COUPLING

(75) Inventors: David W. Baarman, Fennville, MI (US); Matthew J. Norconk, Grand Rapids, MI (US); Brad A. Zylstra, East Grand Rapids, MI (US)

(73) Assignee: Access Business Group International LLC, Ada, MI (US)

( * ) Notice: Subject to any disclaimer, the term of this patent is extended or adjusted under 35 U.S.C. 154(b) by 0 days.

(21) Appl. No.: 13/432,443

(22) Filed: Mar. 28, 2012

(65) Prior Publication Data

US 2012/0181876 A1 Jul. 19, 2012

Related U.S. Application Data

(62) Division of application No. 12/390,178, filed on Feb. 20, 2009.

(60) Provisional application No. 61/030,586, filed on Feb. 22, 2008.

(51) Int. Cl.
*H04B 5/00* (2006.01)
*H01F 38/14* (2006.01)
*H01F 7/02* (2006.01)
*H02J 5/00* (2006.01)

(52) U.S. Cl.
CPC ............... *H01F 38/14* (2013.01); *H04B 5/00* (2013.01); *H04B 5/0037* (2013.01); *H01F 7/021* (2013.01); *H01F 7/0247* (2013.01); *H02J 5/005* (2013.01)
USPC ........................................................ 307/104

(58) Field of Classification Search
CPC ............... H04B 5/00; H04B 5/37; H04B 5/75
USPC ........................................................ 307/104
See application file for complete search history.

(56) References Cited

U.S. PATENT DOCUMENTS 3,059,156 A 6/1957 Moriya
3,786,391 A * 1/1974 Mathauser ............... 439/39

(Continued)

FOREIGN PATENT DOCUMENTS

EP 0 680 057 4/1995
EP 0 680 058 4/1995

(Continued)

OTHER PUBLICATIONS

PCT Notification of Transmittal of the International Search Report and the Written Opinion of the International Searching Authority, or the Declaration; International Search Report; Written Opinion of the International Searching Authority; regarding PCT Application No. PCT/US2009/034642, dated Dec. 11, 2009.

*Primary Examiner* — Adi Amrany
(74) *Attorney, Agent, or Firm* — Warner Norcross & Judd LLP

(57) ABSTRACT

A magnetic positioning system for use in inductive couplings. The magnetic positioning system having a magnet that provides sufficient magnetic force, but does not have enough electrical conductivity to overheat in the presence of the anticipated electromagnetic field. The magnet may be a bonded magnet or a shielded magnet. In another aspect a plurality of magnets are used to provide magnetic attraction forces and said magnetic repulsion forces that cooperate to align the inductive power supply and the remote device. In another aspect, a sensor allows differentiation between different positions of the remote device or inductive power supply. In another aspect, multiple magnets in the inductive power supply interact with multiple magnets in the remote device to position the remote device in different positions.

15 Claims, 15 Drawing Sheets

(56) References Cited

U.S. PATENT DOCUMENTS

| | | | |
|---|---|---|---|
| 3,968,465 A | 7/1976 | Fukui et al. | |
| 4,009,460 A | 2/1977 | Fukui et al. | |
| 4,422,137 A | 12/1983 | Watts | |
| 4,491,793 A | 1/1985 | Germer et al. | |
| 4,616,796 A | 10/1986 | Inoue | |
| 4,723,188 A | 2/1988 | McMurray | |
| 4,989,313 A | 2/1991 | Dzurko et al. | |
| 5,154,509 A | 10/1992 | Wulfman et al. | |
| 5,393,445 A | 2/1995 | Furuya et al. | |
| 5,506,489 A | 4/1996 | Abbott et al. | |
| 6,057,668 A | 5/2000 | Chao | |
| 6,305,656 B1 | 10/2001 | Wemyss | |
| 6,527,971 B1 | 3/2003 | Nakamura et al. | |
| 6,537,463 B2 | 3/2003 | Iwasaki et al. | |
| 6,648,914 B2 | 11/2003 | Berrang et al. | |
| 6,803,744 B1 | 10/2004 | Sabo | |
| 6,825,620 B2 | 11/2004 | Kuennen et al. | |
| 6,838,963 B2 | 1/2005 | Zimmerling et al. | |
| 6,885,270 B2 | 4/2005 | Buswell | |
| 6,906,608 B2 | 6/2005 | Fujiwara et al. | |
| 6,922,591 B2 | 7/2005 | Single | |
| 7,091,806 B2 | 8/2006 | Zimmerling et al. | |
| 7,163,181 B2 | 1/2007 | Omps | |
| 7,212,414 B2 | 5/2007 | Baarman | |
| 7,248,017 B2 * | 7/2007 | Cheng et al. | 320/108 |
| 7,293,308 B2 | 11/2007 | Everett et al. | |
| 7,309,181 B2 | 12/2007 | Hawkins | |
| 7,331,793 B2 * | 2/2008 | Hernandez et al. | 439/38 |
| 7,335,316 B2 | 2/2008 | Takei et al. | |
| 7,352,567 B2 | 4/2008 | Hotelling et al. | |
| 7,522,878 B2 | 4/2009 | Baarman | |
| 7,532,901 B1 * | 5/2009 | LaFranchise et al. | 455/456.6 |
| 7,566,296 B2 | 7/2009 | Zimmerling et al. | |
| 7,889,040 B2 | 2/2011 | Viitanen et al. | |
| 7,948,208 B2 | 5/2011 | Partovi et al. | |
| 7,952,322 B2 | 5/2011 | Partovi et al. | |
| 7,973,635 B2 | 7/2011 | Baarman et al. | |
| 8,385,822 B2 * | 2/2013 | Chatterjee et al. | 455/41.1 |
| 2002/0008973 A1 | 1/2002 | Boys et al. | |
| 2002/0039061 A1 | 4/2002 | Timashov | |
| 2002/0120332 A1 | 8/2002 | Law et al. | |
| 2003/0030342 A1 | 2/2003 | Chen et al. | |
| 2003/0048254 A1 | 3/2003 | Huang | |
| 2004/0232291 A1 | 11/2004 | Carnevali | |
| 2005/0140482 A1 * | 6/2005 | Cheng et al. | 336/180 |
| 2006/0027719 A1 | 2/2006 | Klein | |
| 2007/0072443 A1 | 3/2007 | Rohrbach et al. | |
| 2007/0115085 A1 | 5/2007 | Clemmons | |
| 2007/0182367 A1 * | 8/2007 | Partovi | 320/108 |
| 2007/0279002 A1 | 12/2007 | Partovi | |
| 2008/0002340 A1 | 1/2008 | Chatterjee et al. | |
| 2008/0004634 A1 | 1/2008 | Farritor et al. | |
| 2008/0008897 A1 | 1/2008 | Imagawa et al. | |
| 2008/0044679 A1 | 2/2008 | Maeda et al. | |
| 2008/0067874 A1 * | 3/2008 | Tseng | 307/104 |
| 2008/0157912 A1 | 7/2008 | Tung et al. | |
| 2008/0303619 A1 | 12/2008 | Viitanen et al. | |
| 2009/0096413 A1 | 4/2009 | Partovi et al. | |
| 2009/0236140 A1 | 9/2009 | Randall | |
| 2009/0278494 A1 | 11/2009 | Randall | |
| 2009/0322278 A1 * | 12/2009 | Franks et al. | 320/107 |
| 2010/0081473 A1 * | 4/2010 | Chatterjee et al. | 455/559 |
| 2010/0156345 A1 | 6/2010 | Phelps, III | |
| 2010/0194512 A1 | 8/2010 | Pieteris | |
| 2011/0006611 A1 | 1/2011 | Baarman et al. | |
| 2011/0018360 A1 | 1/2011 | Baarman et al. | |
| 2011/0022350 A1 * | 1/2011 | Chatterjee | 702/150 |
| 2011/0050164 A1 | 3/2011 | Partovi et al. | |

FOREIGN PATENT DOCUMENTS

| | | |
|---|---|---|
| EP | 0823717 | 2/1998 |
| GB | 2331809 | 6/1999 |
| JP | 61-244251 | 10/1986 |
| JP | H07-036556 | 7/1995 |
| JP | 2001-176716 | 6/2001 |
| JP | 2006-238548 | 9/2006 |
| JP | 2007 215342 | 8/2007 |
| JP | 2007-106515 | 10/2008 |
| WO | 2006/097870 A2 | 9/2006 |
| WO | WO 2008002027 | 1/2008 |

* cited by examiner

MAGNETIC POSITIONING FOR INDUCTIVE COUPLING

BACKGROUND OF THE INVENTION

The present invention relates to inductive coupling and more particularly to systems and methods for positioning a device within an inductive field.

With the advent of improved and less expensive electronics, there is a growing use of wireless power supply systems. Wireless power supply systems eliminate the need for cords and therefore eliminate the unsightly mess and the need to repeatedly connect and disconnect remote devices. Many conventional wireless power supply systems rely on inductive power transfer to convey electrical power without wires. A typical inductive power transfer system includes an inductive power supply that uses a primary coil to wirelessly convey energy in the form of a varying electromagnetic field and a remote device that uses a secondary coil to convert the energy in the electromagnetic field into electrical power. To provide an inductive power transfer system with improved efficiency, it is typically desirable to provide proper alignment between the primary coil and the secondary coil. Alignment is often achieved using cradles or other similar structures. For example, the primary coil may be positioned around the outside of a cup shaped to closely receive the portion of the remote device containing the secondary coil. When the remote device is placed in the cup, the two coils become properly aligned. Although helpful in providing alignment, this approach requires deliberate placement of the remote device within the cradle. It may also limit the inductive power supply to use in connection with a single device specially configured to fit within the cup or cradle.

It is known to provide an inductive lighting system for underwater use in a pool with a magnet as set forth in U.S. Publication No. 2002/0008973 A1 to Boys et al, which was published on Jan. 24, 2002. The patent describes that the system may include a magnet for temporarily locating lamp units. Although this reference discloses the use of a magnet for locating a light in the context of an inductive coupling, the sparse disclosure relating to magnets fails to address a number of issues. First, the reference does not disclose where the magnets are located and whether or not magnets are included in both the inductive power supply and the lamp units. Second, the reference fails to show any recognition or offer any solution for the inherent tendency of typical magnets to heat in the presence of an electromagnetic field. Third, the patent fails to recognize the need for or provide any solution to address orientation of the remote device with respect to the inductive power supply.

SUMMARY OF THE INVENTION

The present invention provides a magnetic positioning system for use in inductive couplings. In one aspect, the present invention provides a magnetic positioning system having a magnet that provides sufficient magnetic force, but does not have enough electrical conductivity to overheat in the presence of the anticipated electromagnetic field. In one embodiment, the magnet is a bonded magnet having particles of a rare earth magnet bound together by a binder. The bonded magnet may include neodymium particles combined with an epoxy binder.

In a second aspect, the present invention provides a magnetic positioning system having a supplemental magnet to enhance the magnetic force of a principal magnet. In one embodiment, the supplemental magnet is positioned sufficiently close to the primary magnet to allow the magnetic field from the supplemental magnet to combine with and strengthen the magnetic field of the primary magnet. The primary magnet may be positioned within and subject to the full electromagnetic field, but be sufficiently non-conductive that it does not overheat. The supplemental magnet may be relatively conductive, but may be shielded so that it is subject to a lesser magnetic field and therefore does not overheat. The system may include a shield, such as a ferrite plate, positioned between the supplemental magnet and the primary magnet. The shield may be sized and shaped to adequately reduce the amount of the electromagnetic field reaching the supplemental magnet.

In a third aspect, the present invention provides a magnet positioning system having an arrangement of magnets configured to provide proper orientation between the remote device and the inductive power supply. The power supply and remote device may include magnets arranged in matching patterns to aid in optimal coil alignment.

These and other objects, advantages, and features of the invention will be readily understood and appreciated by reference to the detailed description of the current embodiment and the drawings.

DESCRIPTION OF THE CURRENT EMBODIMENT

Figure 1:
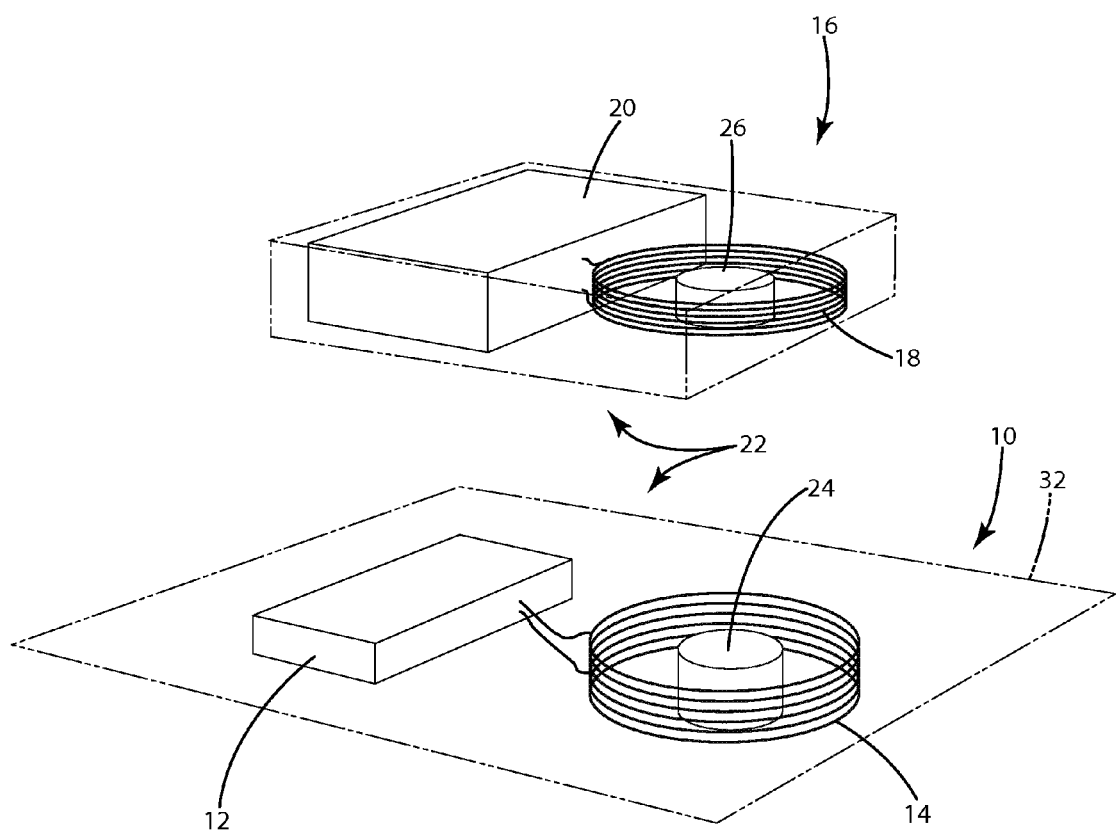
FIG. 1 is a perspective view of an inductive power supply and remote device in accordance with an embodiment of the present invention.
Figure 2:
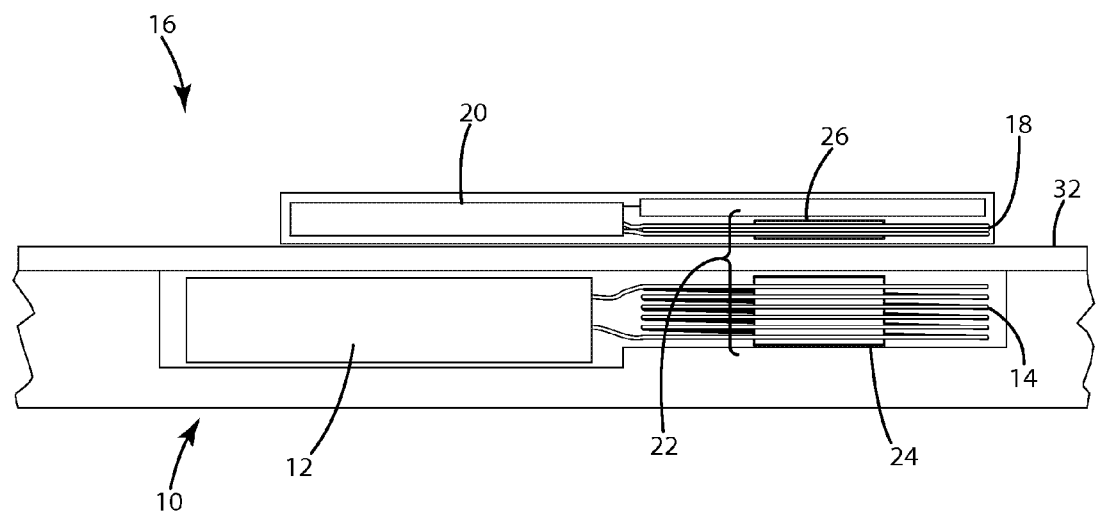
FIG. 2 is a sectional view of the inductive power supply and remote device.

An inductive power supply and remote device incorporating a magnetic positioning system in accordance with the present invention are shown in FIG. 1. The inductive power supply 10 generally includes power supply circuitry 12 and a primary coil 14. The remote device 16 generally includes a secondary coil 18 and a load 20. The magnetic positioning system 22 generally includes a primary magnet 24 positioned in the approximate center of the primary coil 14 and a secondary magnet 26 positioned in the approximate center of the secondary coil 18. The two magnets 24 and 26 are oriented to attract one another and therefore assist in providing proper alignment between the power supply 10 and the remote device 16. The magnets 24 and 26 are sufficiently non-electrically conductive that they do not heat beyond acceptable limits in the presence of the electromagnetic field.

The present invention is suitable for use with essentially any inductive power supply. Accordingly, the inductive power supply 10 will not be described in detail. Suffice it to say that the inductive power supply 10 includes power supply circuit 12 and a primary coil 14. The power supply circuit 12 generates and applies alternating current to the primary coil 14. As a result of the alternating current applied by the power supply circuit 12, the primary coil 14 generates an electromagnetic field. The power supply circuit 12 may be essentially any circuitry capable of supplying alternating current to the primary coil 14 at the desired frequency or frequencies. For example, the power supply circuit 12 may be the resonant seeking circuit of the inductive power supply system disclosed in U.S. Pat. No. 6,825,620, which is entitled "Inductively Coupled Ballast Circuit" and issued Nov. 30, 2004, to Kuennen et al; the adaptive inductive power supply of U.S. Pat. No. 7,212,414, which is entitled "Adaptive Inductive Power Supply" and issued May 1, 2007, to Baarman; or U.S. Pat. No. 7,522,878, which is entitled "Adaptive Inductive Power Supply with Communication" and issued Apr. 21, 2009, to Baarman—all of which are incorporated herein by reference in their entirety.

The primary coil 14 of the illustrated embodiment is a circular coil of wire suitable for generating an electromagnetic field. In some applications, the primary coil 14 may be a coil of Litz wire. The characteristics of the coil may vary from application to application. For example, the number of turns, size, shape and configuration of the coil may vary. Further, the characteristics of the wire may vary, such as length, gauge and type of wire. Although described in connection with a coil of wire, the primary coil 14 may alternatively be essentially any structure capable of generating a suitable electromagnetic field. In one embodiment, the primary coil 24 (or secondary coil 26) may be replaced by a printed circuit board coil, such as a printed circuit board coil incorporating the inventive principles of U.S. Ser. No. 60/975,953, which is entitled "Printed Circuit Board Coil" and filed on Sep. 28, 2007 by Baarman et al., and is a priority document of U.S. Pat. No. 7,973,635 filed on Sep. 24, 2008 and issued Jul. 5, 2011. The content of U.S. Ser. No. 60/975,953 is incorporated herein by reference in its entirety.

The magnetic positioning system 22 includes a primary magnet 24 incorporated into the inductive power supply 10. Although the position of the primary magnet 24 may vary, the primary magnet 24 may be disposed within the primary coil 14. For example, in applications that include a generally circular primary coil 14, the primary magnet 24 may be coaxially positioned within the primary. The primary magnet 24 is manufactured from a material that is capable of providing sufficient magnetic force, but at the same time is not sufficiently electrically conductive to heat excessively in the presence of the electromagnetic field generated by the primary coil 14. The amount of heat acceptable in a given situation will vary depending on the application, for example, depending on the ability of the surrounding materials and closely positioned electronics to withstand heat. In one embodiment, the primary magnet is a bonded magnet, such as a compression molded or injection molded magnet. For example, bonded rare earth magnets have proven suitable, including bonded neodymium and samarium cobalt magnets. The binder may vary from application to application, but in the illustrated embodiment is a non-electrically conductive epoxy. In some applications, it may be possible to form a suitable bonded magnet without a binder. Although rare earth bonded magnets have proven to be suitable, a variety of alternative magnets may also be suitable depending on the electromagnetic field, the required magnetic force and the tolerance for heat build-up. For example, the primary magnet 24 may be a ceramic ferrite magnet. Typical ceramic ferrite magnets may have a magnetic flux density that is substantially less than typical rare earth bonded magnets. Accordingly, they may be more suitable in applications where less magnetic force is required.

In addition to assisting in initial placement of the remote device, the magnetic positioning system may be used to maintain the remote device in the proper position over time. In applications where it is desirable to retain the remote device is a specific orientation while it is on the inductive power supply, the magnetic positioning system may incorporate multiple magnets, as described in more detail below. To provide these functions, the magnets may be sized with sufficient flux density to hold the device in place despite potential external forces, such as gravity and vibration. For example, the magnets may have sufficient strength to hold the remote device on an incline or slanted surface, which may provide an improved viewing angle or facilitate use of the remote device while it is on the inductive power supply. In some applications, the magnets may have sufficient flux density to hold the remote device in place despite acceleration and deceleration forces, such as when charging the remote device in a moving vehicle. In those applications where a user may interact with the remote device while it is on the inductive power supply, the magnets may have sufficient strength to hold the device in place despite user interaction. For example, a user may push a button or manipulate a touch screen to operate a phone or a digital media player. In some applications, manipulation of the device as a whole may be desirable. For example, there may be applications where spinning a remote device while it is on the inductive power supply is used for special effects or user input (e.g. a gaming controller, control adjustment and display realignment). In such applications, the magnet strength and configuration may be set to hold the device in position while it is spun or rotated.

The inductive power supply 10 may be contained within a housing 30, such as a dedicated housing having a surface 32 on which to place the remote device 16. The size, shape and configuration of the surface 32 may vary. For example, the surface 32 may be flat (as shown) or it may be contoured to receive one or more remote devices 16. The surface 32 may include a low friction material to enhance the ability of the magnets 24 and 26 to draw the remote device 16 into proper alignment. Alternatively, the inductive power supply 10 may be housed within a work surface, such as a desktop, table top or counter top. In these embodiments, the remote device 16 may be placed directly of the work surface in which the inductive power supply is contained. As another alternative, the inductive power supply 10 may be disposed within a ceiling or within a wall or other inclined/vertical surface. For example, the inductive power supply 10 may be used to supply power to a ceiling-mount or wall-mount light fixture (not shown). In ceiling-mount and wall-mount applications, the magnetic positioning system may be used to secure the remote device (e.g. the light fixture) to the ceiling or wall, thereby eliminating the need for other mechanical fasteners. This will not only facilitate installation, but will also simplify replacement of light fixtures or other remote devices. The strength of the magnetic positioning system 22 may vary from application to application. In some applications, it may be desirable to have sufficient force to draw the remote device 16 into proper alignment from within a specific range (e.g. 3 centimeters). The amount of magnetic force required to center the remote device from a given range will depend in large part on the contour/shape and coefficient of friction of the inductive power supply surface 32, as well as on the weight and coefficient of friction of the remote device 16. In other applications, it may be desirable to have sufficient magnetic strength to support a remote device on a ceiling or a wall. In such applications, the weight of the remote device 16 will play a key role in determining the appropriate magnetic strength. In still other application, it may be desirable simply to provide a noticeable magnetic draw toward proper alignment. In such applications, it may be necessary to manually move the remote device 16 into proper alignment, but the magnetic force may provide a perceptible guide.

As noted above, the remote device 16 generally includes a secondary coil 18 and a load 20. The remote device 16 is illustrated representatively in the drawings, but it may be essentially any device or component that operates on or otherwise responds to an electromagnetic field. For example, the remote device 16 may be an active device having a load 20 that operates on electrical power received inductively from the inductive power supply 10, such as a cell phone, personal digital assistant, digital media player or other electronic device that may use inductive power to recharge an internal battery. As another example, the remote device 16 may be a passive device that achieves a function through the direct application of an electromagnetic field to the load 20, such as an inductive heater that is directed heated by the electromagnetic field. In typical passive applications, the remote device 16 will not include a secondary coil 18. However, the magnetic positioning system 22 may still be used to provide proper alignment between the primary coil 14 and the element (e.g. the load) of the remote device 16 that is intended to receive the electromagnetic field.

The secondary coil 18 of the illustrated embodiment is a circular coil of wire suitable for generating electricity when in the presence of a varying electromagnetic field. As shown, the secondary coil 18 may correspond in size and shape to the primary coil 14. For example, the two coils 14 and 18 may have substantially equal diameters. In some applications, the secondary coil 18 may be a coil of Litz wire. As with the primary coil 14, the characteristics of the secondary coil 18 may vary from application to application. For example, the number of turns, size, shape and configuration of the secondary coil 18 may vary. Further, the characteristics of the wire may vary, such as length, gauge and type of wire. Although described in connection with a coil of wire, the secondary coil 18 may alternatively be essentially any structure capable of generating sufficient electrical power in response to the intended electromagnetic field.

The magnetic positioning system 22 includes a secondary magnet 26 that is incorporated into the remote device 16. The secondary magnet 26 is positioned to correspond with the primary magnet 24. More specifically, the secondary magnet 26 is positioned at a location where it will provide proper alignment between the secondary coil 18 and the primary coil 14 when the primary magnet 24 and the secondary magnet 26 are aligned. In the illustrated embodiment, the secondary magnet 26 is disposed substantially coaxially within the secondary coil 18. In this position, the magnetic positioning system 22 aligns the primary coil 14 and the secondary coil 18 regardless of the orientation of the remote device 16 about the axis of the secondary coil 18. As with the primary magnet 24, the secondary magnet 26 is manufactured from a material capable of providing sufficient magnetic force, but at the same time not sufficiently electrically conductive to heat excessively in the presence of the electromagnetic field generated by the primary coil 14. The amount of heat acceptable in the remote device 16 will vary depending, for example, on the ability of the surrounding materials and closely positioned electronics to withstand heat. The secondary magnet 26 may be a bonded magnet, such as a compression molded or injection molded magnet. The secondary magnet 26 may be a bonded rare earth magnet, including a bonded neodymium magnet or a bonded samarium cobalt magnet. As with the primary magnet 24, the binder is a non-electrically conductive epoxy, but may vary from application to application and may be eliminated in some application. The secondary magnet 18 may be any of a variety of alternative magnets capable of providing suitable magnetic force without excessive heat build-up. For example, the secondary magnet 26 may be a ceramic ferrite magnet.

Although the primary magnet 24 and the secondary magnet 26 are both manufactured from materials that have limited RF absorption and therefore limited heating, in some applications it may not be necessary for both magnets to have these characteristics. For example, in some applications, it may be possible for either the primary magnet 24 or the secondary magnet 26 to be a typical sintered rare earth magnet. This is most likely to be possible in application where either the inductive power supply or the remote device has a high tolerance to temperature or where the electromagnetic field is sufficiently weak that one of the two magnets does not undergo excessive heating.

Experience has revealed that magnet size is also relevant to heat build-up. For example, it may be possible to reduce heating by reducing magnet volume. In the context of a cylindrical magnet, heating may be reduced by decreasing diameter and/or height of the magnet.

In alternative embodiment, the magnets 24 and 26 may be used to move the primary coil 12 rather than the remote device (not shown). To achieve this objection, the primary coil 14 may be loosely positioned within the inductive power supply 10. For example, the primary coil 14 may be freely placed within a void of substantially greater size in the desired direction of motion. When the remote device 16 is placed within sufficient distance of the primary coil 14, the magnetic positioning system 22 will move the primary magnet 24 and consequently the primary coil 14 to an aligned position beneath the secondary magnet 26 in the remote device 16.

Figure 3:
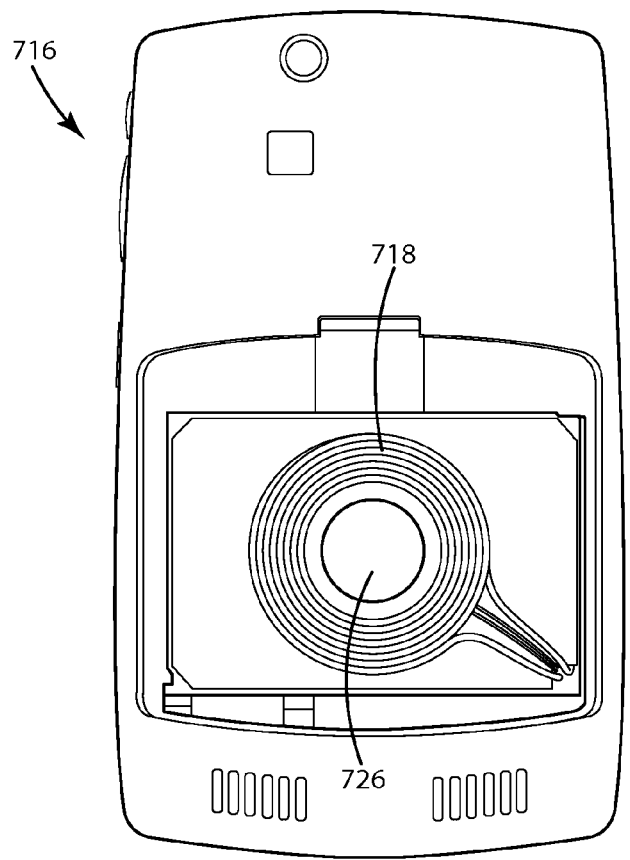
FIG. 3 is an illustration of a remote device incorporating a secondary magnet.
Figure 4:
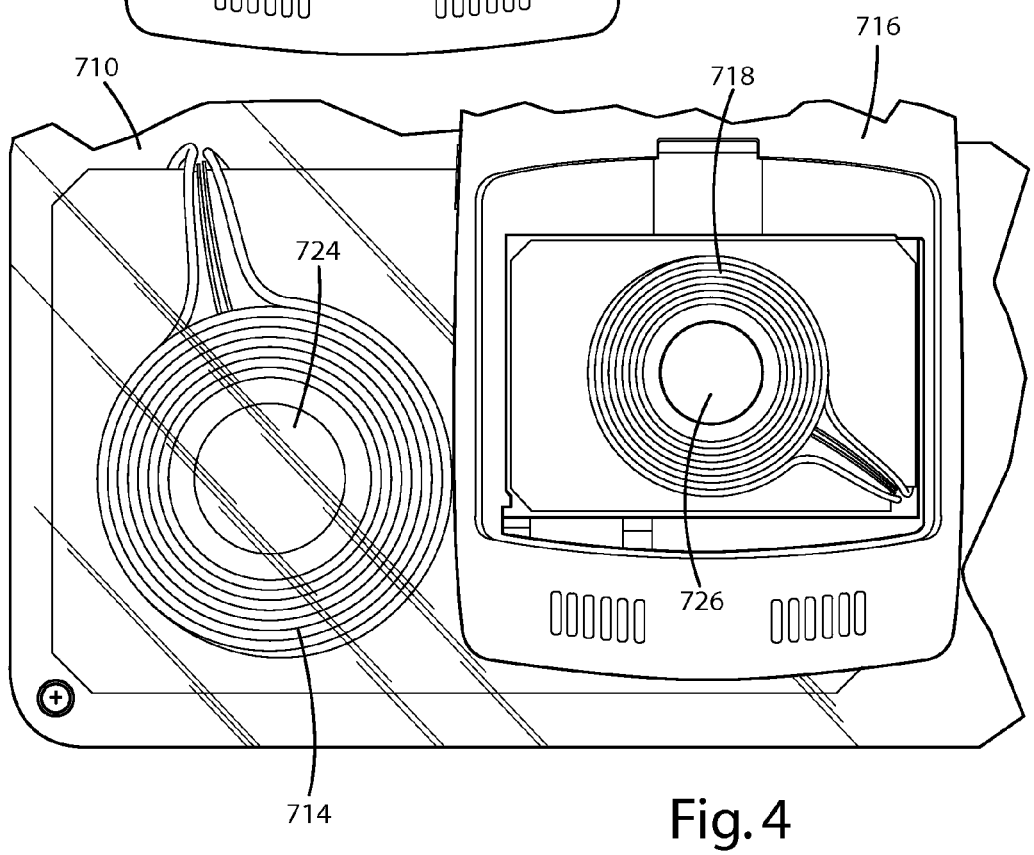
FIG. 4 is an illustration of an inductive power supply and a remote device.

FIGS. 3 and 4 are photographs showing a specific implementation of an embodiment of the present invention. FIG. 3 is a photograph of a cellular telephone 716 with the battery cover (not shown) removed to show the secondary coil 718 and secondary magnet 726. As can be seen, the secondary coil 718 and secondary magnet 726 are coaxially disposed within the battery compartment of the cellular telephone 716. The cellular telephone 716 may include a special battery compartment door (not shown) to accommodate the secondary coil 718 and secondary magnet 726. For example, the battery compartment may be closed with an enlarged battery cover (not shown), such as the type used to accommodate an extended life battery. FIG. 4 is a photograph showing the cellular telephone 716 resting atop an inductive power supply 710. The inductive power supply 710 includes a transparent cover that defines the charging surface 732. The cellular telephone 716 is not shown in proper alignment with the inductive power supply 710 to permit viewing of the primary coil 714 and primary magnet 724 through the transparent cover. As can be seen, when the cellular telephone 716 is positioned with secondary magnet 726 in alignment with primary magnet 724, the secondary coil 718 will be aligned with the primary coil 714, thereby facilitating efficient operation of the system.

Figure 5:
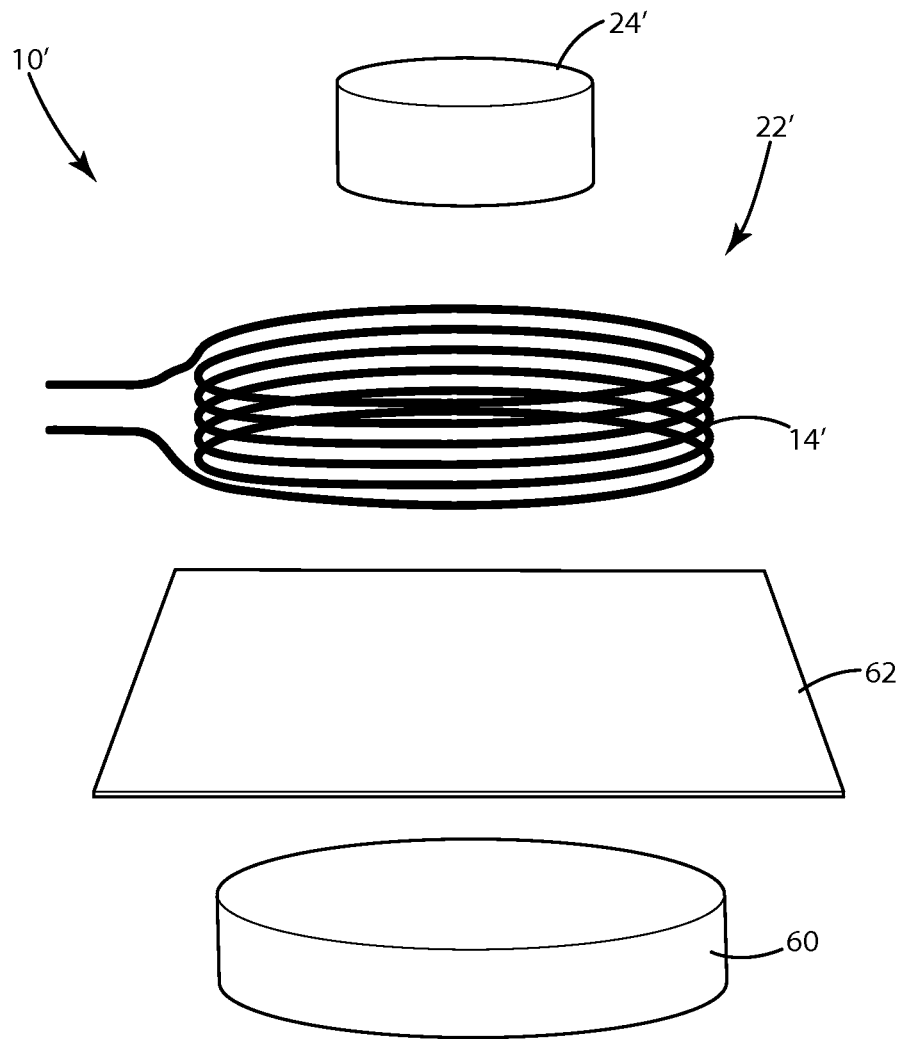
FIG. 5 is an exploded perspective view of portions of a first alternative embodiment having a supplemental magnet and shield.
Figure 6:
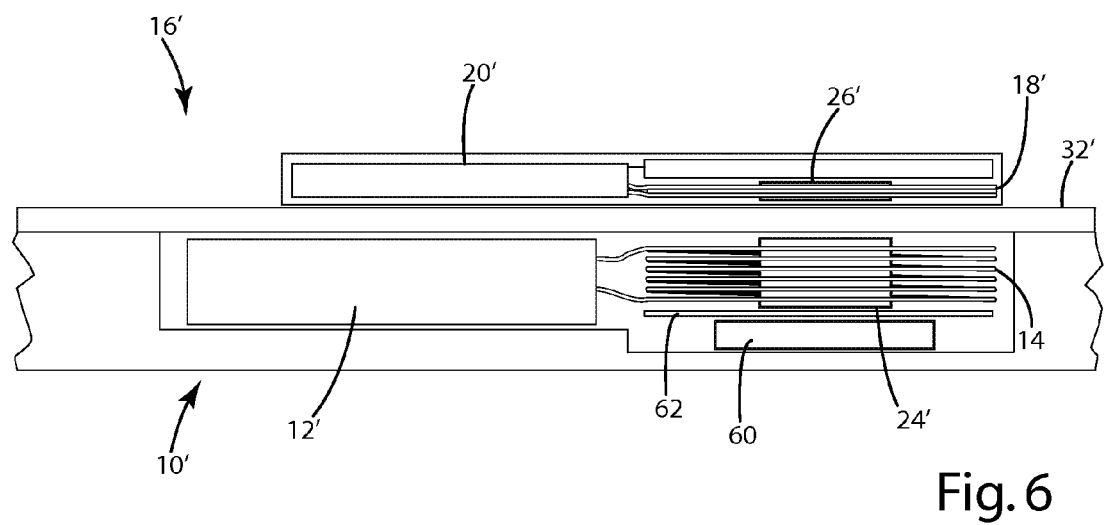
FIG. 6 is a sectional view of the first alternative embodiment.

An alternative embodiment of the present invention is shown in FIGS. 5 and 6. In this embodiment, at least one of the magnets 24 and 26 is enhanced by a supplemental magnet. For purposes of disclosure, this aspect of the invention will be described in connection with the use of a supplemental magnet 60 in the inductive power supply 10'. Except as described, the inductive power supply 10,' remote device 16' and magnetic positioning system 22' are essentially identical to those described above. Referring now to FIG. 6, the inductive power supply 10' generally includes an inductive power circuit 12' and a primary coil 14', and the remote device 16' generally includes a secondary coil 18' and a load 20'. The magnet positioning system 22' generally includes a primary magnet 24', a supplemental magnet 60, a shield 62 and a secondary magnet. The primary magnet 24', supplemental magnet 60 and shield 62 are positioned in the inductive power supply 10'. As shown, the primary magnet 24' may be coaxially positioned within the primary coil 14'. The shield 62 may be positioned below the primary coil 14' and the primary magnet 24'. The supplemental magnet 60 of this embodiment is positioned immediately below the shield 62 opposite the primary magnet 24'. The supplemental magnet 60 may be coaxially aligned with the primary magnet 24'. The shield 62 is configured to reduce the amount of the electromagnetic field that reaches the supplemental magnet 60. To achieve this end, the illustrated shield 62 is large enough to be at least coextensive with the primary coil 14'. The size, shape and configuration of the shield 62 may, however, vary from application to application depending in part on the size, shape and configuration of the primary coil 14' and the supplemental magnet 60, as well as on the desired amount of heat protection. The supplemental magnet 60 may be essentially any magnet capable of supplementing the magnetic field of the primary magnet 24' to produce suitable magnetic force. For example, the supplemental magnet 60 may be a rare earth magnet, such as a sintered rare earth magnet. In use, the magnetic field from the supplemental magnet 60 will combine with the magnetic field from the primary magnet 24'. The combined magnetic fields will provide greater magnetic force than the primary magnet 24' would have provided on its own. The shield 62 provides sufficient isolation of the supplemental magnet 60 from the electromagnetic field of the primary coil 14' to prevent excessive heating. For example, the shield 62 will act as an electromagnetic field guide that causes a portion of the electromagnetic field that would have otherwise encompassed the supplemental magnet 62 to pass through the shield 62 above the supplemental magnet 62. As a result, the supplemental magnet 60 helps to improve magnetic force without creating the degree of heat generation that would have occurred if the supplemental magnet 60 had been placed directly in the electromagnetic field.

Figure 7:
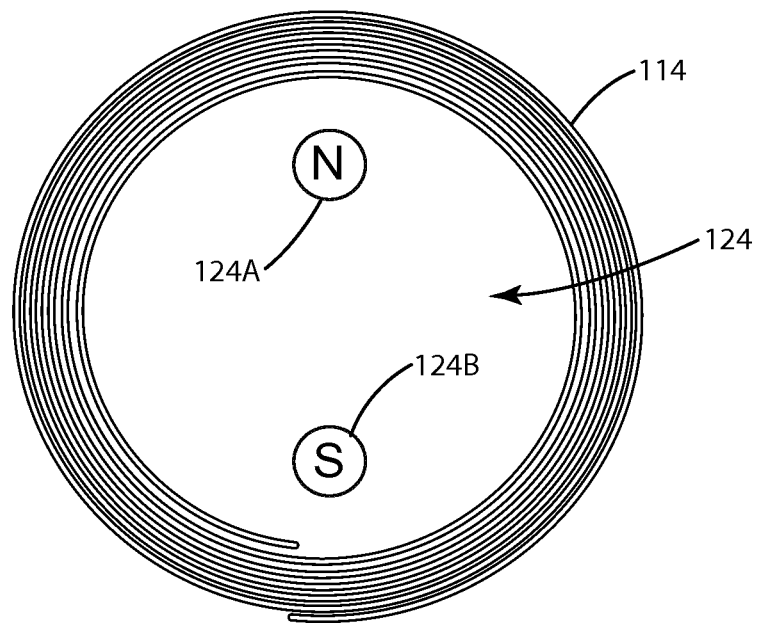
FIG. 7 is a representational view of a primary magnet layout and corresponding secondary magnet layout.
Figure 7:
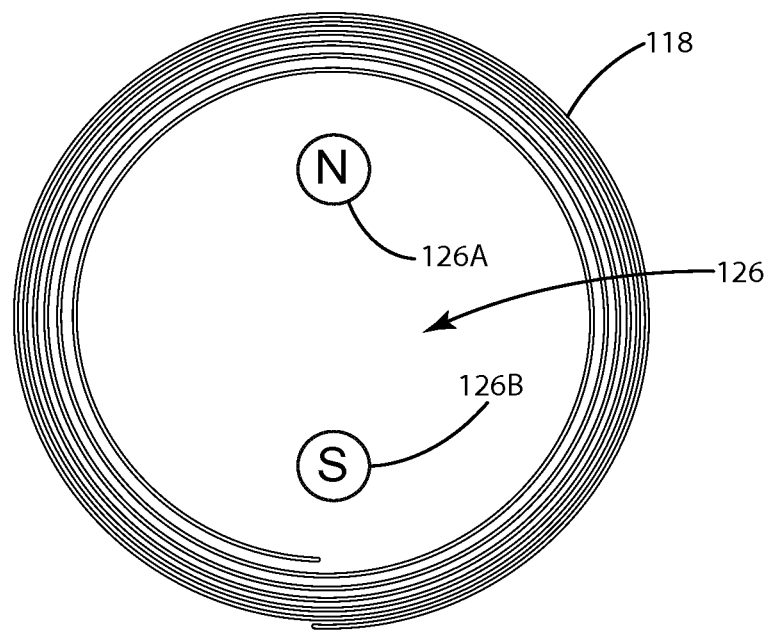
Figure 8:
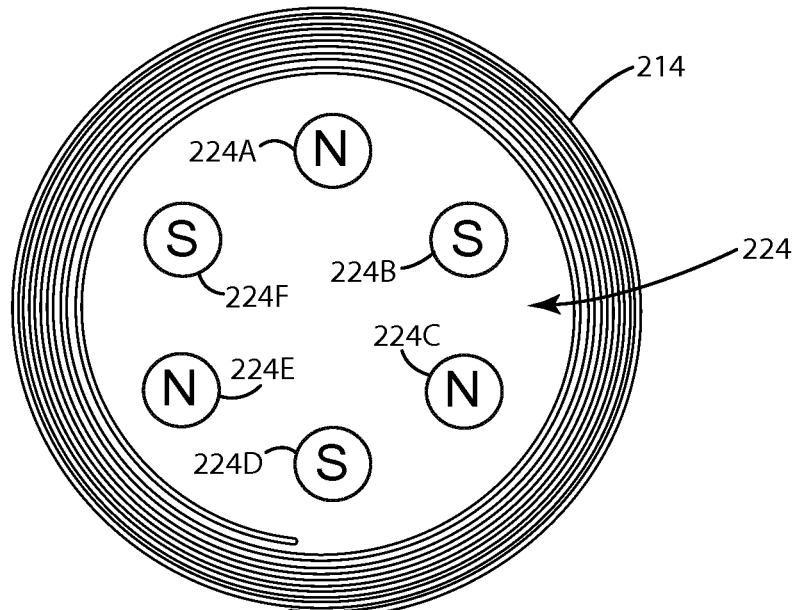
FIG. 8 is a representational view of an alternative magnet layout.
Figure 9:
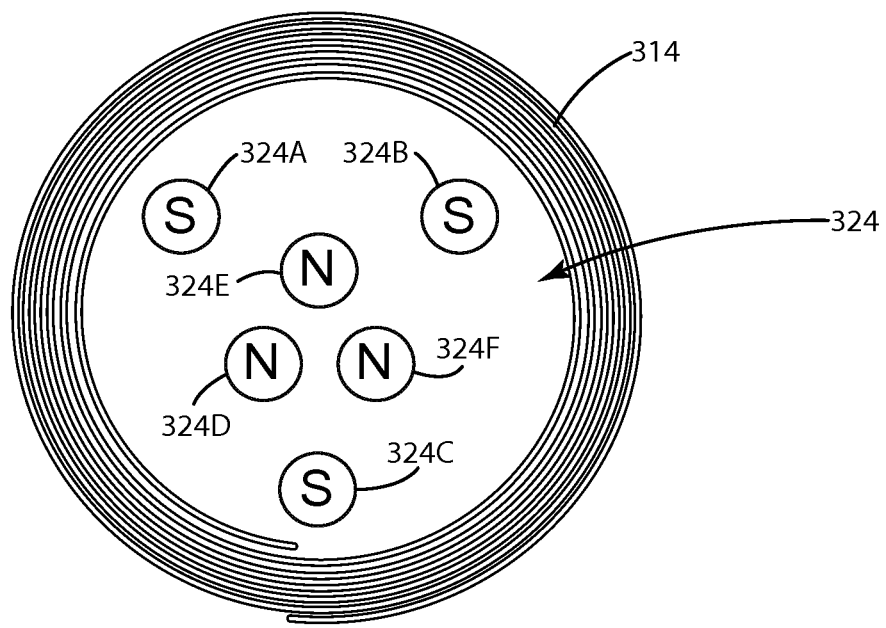
FIG. 9 is a representational view of a second alternative magnet layout.

The present invention also provides a magnetic positioning system capable of assisting placement of a remote device in the appropriate orientation using a plurality of magnets. A variety of alternative embodiments illustrating this aspect of the invention are shown in FIGS. 7-12. For purposes of disclosure, this aspect of the invention will be described with reference to representation views of various exemplary magnet layouts. These and other magnet layouts may be incorporated into essentially any inductive power supply system. The magnet pattern is selected to provide full magnetic alignment of the remote device at the desired orientation(s). In multiple magnet embodiments, it may be possible for one or more of the individual magnets to be a sintered rare earth magnet (or other type of electrically conductive magnet) provided that that particular magnet is located sufficiently remote from the electromagnetic field that it does not generate excessive heat. FIG. 7 shows a primary magnet 124 having a pair of magnets 124a-b and a secondary magnet 126 having a pair of magnets 126a-b located in corresponding positions. With this layout, the magnetic positioning system 122 will provide the greatest attractive force when the magnets 124a-b and 126a-b are aligned. When the remote device is positioned so that the corresponding magnets are aligned, the primary coil 114 and the secondary coil 118 will be properly aligned to facilitate efficient operation. In some applications, the magnetic positioning system 122 may be able to draw the remote device (not shown) into optimal alignment. In other applications, the user may need to adjust the remote device until proper alignment can be felt through magnetic attraction. Referring now to FIG. 8, the primary magnet 224 may include a plurality of separate magnets 224a-f that are arrange in a specific pattern. Although not shown, the secondary magnet 226 may also include a plurality of separate magnets 226a-f. The magnets 226a-f making up the secondary magnet 226 may be arranged in an identical and complimentary pattern with respect to the individual magnets 224a-f of the primary magnet 224. Alternatively, the secondary magnet 226 may include a different number and arrangement of magnets, provided that they are configured to provide proper orientation when positioned adjacent to the primary magnet 224. The magnet layout of magnetic positioning system 222 provides three orientations at which full magnetic attraction occurs. The layout of magnetic positioning system 222 may help a user avoid placing the remote device 216 in an incorrect position because a properly aligned remote device will result in magnetic force from all six aligned magnets, while the maximum misaligned force with come from two magnets. The difference in attractive force between these two positions should be apparent to a user. Another alternative layout is shown in FIG. 9. In this embodiment, the magnetic positioning system 322 includes a primary magnet 324 with a plurality of separate magnets 324a-f that are arranged in a somewhat different pattern that magnets 224a-f. Although not shown, the secondary magnet may also include a plurality of separate magnets arranged in an identical and complimentary pattern with respect to the individual magnets 324a-f of the primary magnet 324. Alternatively, the secondary magnet may include a different number and arrangement of magnets, provided that they are configured to provide proper orientation when positioned adjacent to the primary magnet 324. The magnet layout of magnetic positioning system 322 provides three orientations at which full magnetic attraction occurs. As with the layout of FIG. 8, this layout may help a user avoid placing the remote device in an incorrect position.

In some embodiments, this tactile feedback provided by the magnetic positioning system is sufficient to allow the user to align the magnets within a magnetic hot spot on a blind surface. That is, no markings or other indications are necessary to allow the user to align the magnets. As the user adjusts the remote device, the amount of magnetic attraction and magnetic repulsion may change based on the location of the remote device. By moving the remote device towards any magnetic attraction and away from any magnetic repulsion, the user can guide the remote device to one or more suitable alignment locations. This adjustment can be made "blind" without the user looking at the surface. In one embodiment, the user could align the remote device for charging while performing an activity that demands visual attention, such as for example driving.

Figure 10:
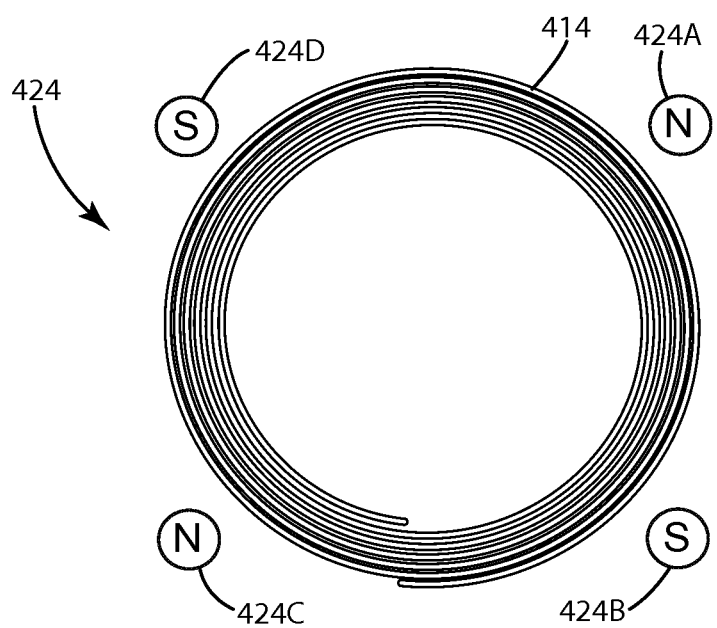
FIG. 10 is a representational view of a third alternative magnet layout.

Although the embodiments of FIGS. 7-9 show the plurality of magnets 124a-f within the primary coil 114, the primary magnet 124 may be arranged with some or all of the individual magnets 124a-f outside the primary coil 114. For example, FIG. 10 shows a primary magnet 424 with four magnets 424a-d positioned outside the primary coil 414. Again, the secondary magnet (not shown) may include a matching arrangement of four magnets or it may include some other number of magnets provided that they are arranged to give maximum magnetic attraction when the remote device is positioned in the proper orientation(s).

Figure 11:
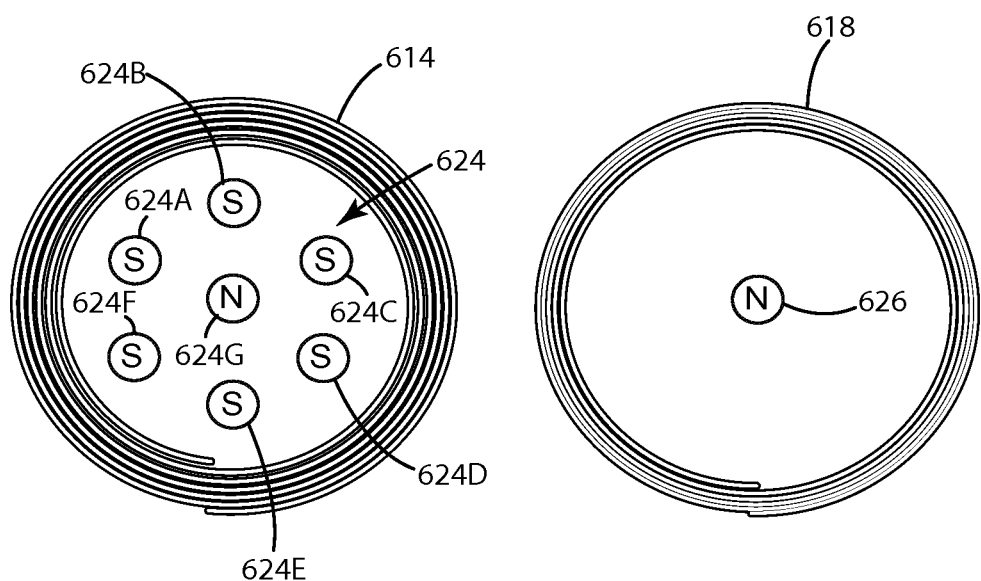
FIG. 11 is a representational view of primary and secondary magnets in accordance with a fourth alternative magnet layout.
Figure 12:
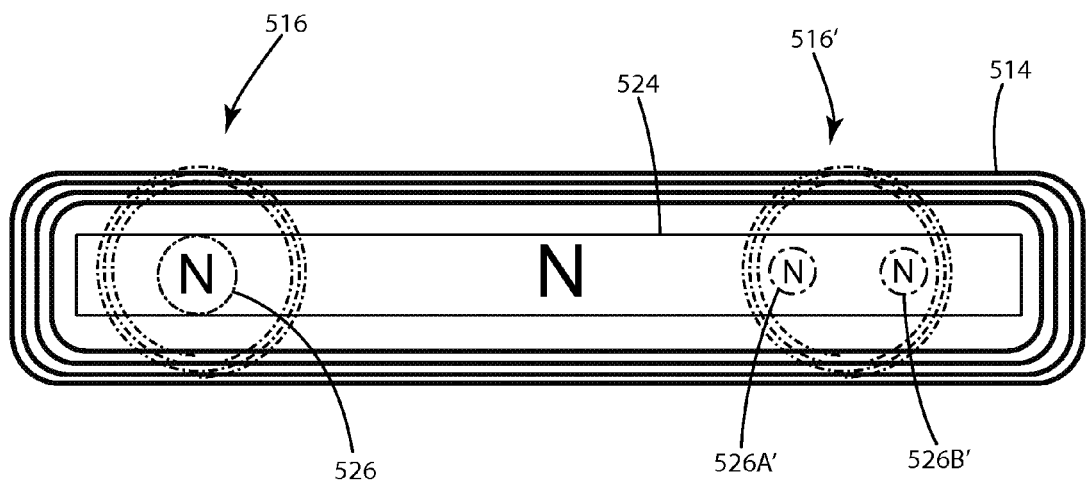
FIG. 12 is a representational view of an alternative embodiment having a bar magnet.

The embodiment of FIG. 11 show an example of a magnetic positioning system in which the magnet layout in the primary magnet 624 is different from the magnet layout in the secondary magnet 626. The primary magnet 624 is positioned within the primary coil 614 and the secondary magnet 626 is positioned within the secondary coil 618. As can be seen, the primary magnet 624 includes a plurality of magnets 624a-g arranged with six magnets of one polarity forming a ring about a seventh magnet of opposite polarity. The secondary magnet 626 includes a single magnet matching the polarity of the central magnet 624g of the primary magnet 624. The plurality of magnets 624a-f and secondary magnet 626 provide a magnetic repulsion force. The magnet 624g and the secondary magnet 626 provide a magnetic attraction force. The magnetic attraction force and said magnetic repulsion force cooperate to align the inductive power supply and the remote device.

Although the magnets are shown as cylindrical magnets, the shape of the magnets may vary from application to application as desired. A bar magnet may be used in application where it is desirable for a remote device to be positioning essentially anywhere along the length of the bar magnet. For example, in connection with a track lighting assembly, the primary magnet 524 may be a bar magnet located within a primary coil 514. The primary coil 514 may be an oval or otherwise elongated coil. The bar magnet 524 may permit one or more remote devices 516 (e.g. light fixtures) to be placed at different positions along the extent of the primary coil 514. The remote device 516 may include a single magnet 526 when it is not necessary or desirable for the magnetic positioning system 522 to assist in positioning the remote device 516 in a specific orientation. Alternatively, the remote device 516' may include multiple magnets 526a-b' when assistance in establishing a specific orientation is desired.

Figure 13:
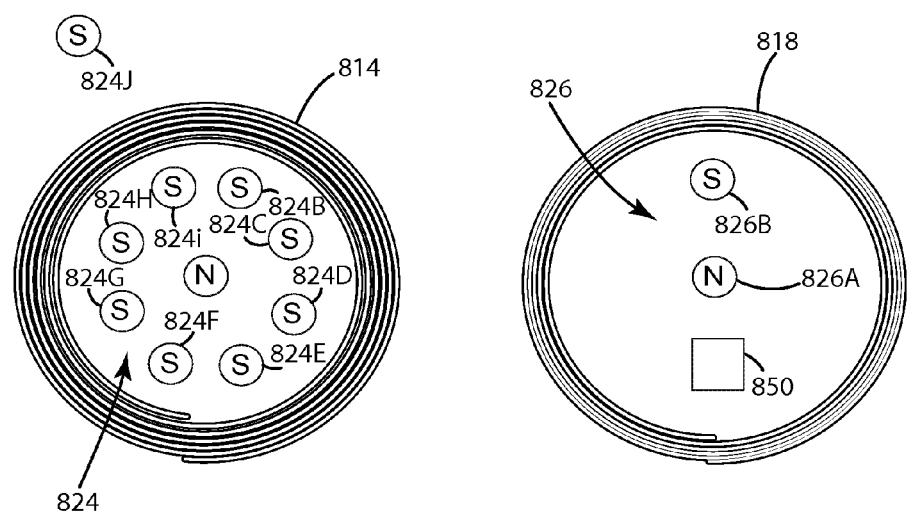
FIG. 13 is a representational view of primary and secondary magnet layouts of an alternative embodiment in which the magnetic positioning system may be used to determine the orientation of the remote device.

The magnetic positioning system may also be used to determine the orientation of the remote device with respect to the inductive power supply. This information may be used to provide input to the remote device, such as control information. The remote device may act on the input or it may pass the input on to another device. As an example of the former, the magnetic positioning system may be used to determine whether to operate the display on the remote device in portrait or landscape mode. As an example of the latter, the remote device may itself be a control for another device. In this example, a user may change the orientation of the remote device to provide an input to the other device. The magnetic positioning system may also be capable of determining direction of rotation, for example, clockwise or counter clockwise rotation of the remote device. Information about the direction of rotation may, among other things, be useful in implementing commands in the remote device or another device. For example, direction of rotation may be used as a volume control input with clockwise rotation being an input signal to increase volume or brightness and counterclockwise rotation being an input signal to decrease volume or brightness. FIG. 13 is a representation of the primary magnet layout and the secondary magnet layout for one embodiment of this aspect of the invention. In this embodiment, the remote device is capable of being positioned in one of eight unique orientations. As shown, the primary magnet 824 includes nine individual magnets 824*a-i* arranged within the primary coil 814, and the secondary magnet 826 includes two individual magnets 826*a-b* located within the secondary coil 818. To align the remote device, the central primary magnet 824*a* and the central secondary magnet 826*a* are aligned and the outer secondary magnet 826*b* is aligned with any one of the eight outer primary magnets 824*b-i*, thereby giving eight unique orientations. The primary magnet 824 may also include an indexing magnet 824*j* that functions as a reference magnet to create differentiation in the magnetic field between different orientations of the remote device 816. In this embodiment, the indexing magnet 824*j* is located outside the primary coil 814, but that is not strictly necessary. For example, one or more indexing magnets may be located at other positions in or around the inductive power supply or at locations other than in the inductive power supply, such as in an adjacent structure. The remote device 816 may also include one or more Hall effect sensors 850 (or other components capable of measuring a magnetic field) that provide information regarding the magnet field surrounding the remote device 816. Multiple sensors may improve the ability of the system to accurately assess the orientation or motion of the remote device. The position of the Hall effect sensor may vary from application to application. For example, two Hall effect sensors arranged at different locations and in different orientations may provide improved sensitivity or accuracy. Given the presence of the indexing magnet 824*j*, the readings of the Hall effect sensor(s) 850 will uniquely vary from one orientation of the remote device 816 to another. A controller (not shown) within the remote device 816 may compare the readings obtained from the Hall effect sensor(s) with a look-up table to determine the orientation of the remote device 816 and/or the control, function or other action associated with the specific orientation. In this way, the orientation of the remote device 816 may be used to provide an input or control signal to the remote device 816. The remote device 816 may act on that input or control signal internally or it may be sent to another device. Although the illustrated embodiment includes an indexing magnet 824*j*, an indexing magnet may not be necessary in all applications. For example, in those applications where the sensor will receive unique readings throughout the range of possible orientations without an indexing magnet, an indexing magnet may not be necessary. Examples of applications in which an indexing magnet may not be necessary include situations where the magnet layout of the primary is not uniform or symmetric. Another example of an application where an indexing magnet may not be required is an application where the electromagnetic field generated by the primary gives the sensor readings sufficient differentiation from orientation to orientation. Although described in connection with determining orientation/motion on the remote device side of the inductive coupling, orientation/motion may alternatively or additionally be determined on the inductive power supply side of the inductive coupling. For example, the orientation or motion of the remote device may be used as a control signal for the inductive power supply or some other device in communication with the inductive power supply. In applications where the sensor(s) (e.g. Hall effect sensor) is located on the inductive power supply side of the inductive coupling, it may be necessary to add an indexing magnet to the remote device to create the desired degree of differentiation in the sensor readings from one orientation of the remote device to another.

The magnetic positioning system may continue to supply power during movement of the remote device. That is, the inductive power supply may supply power while the remote device is in a first position, throughout movement of the remote device, and while the remote device is in a second position. For example, the remote device may be rotatable 360 degrees through the use of the magnetic positioning system. The inductive power supply may supply power while the remote device is at rest in a first orientation, while the remote device is being rotated, and while the remote device is at rest in a second orientation. In another example, the inductive power supply may supply power while the remote device is in a first resting position on a power transfer surface, while the remote device is slid around the power transfer surface, and while the remote device is in a second resting position on the power transfer surface. In some embodiments, the remote device may continue to be supplied power while being separated from the power transfer surface. Once the remote device is brought out of proximity of the inductive power supply, power transfer stops. When the remote device is brought back within proximity of the inductive power supply, power transfer may resume or restart. If necessary, the inductive power supply may make adjustments to maintain the power transfer accounting for differences in the positional relationship. For example, in some embodiments, the inductive power supply may make an adjustment or a combination of adjustments to the operating frequency, resonant frequency, rail voltage, or a number of other inductive power supply parameters.

Various embodiments of shielding a magnet from some or all of the electromagnetic field generated during transfer of power from an inductive power supply to a remote device are illustrated in FIGS. 14-33. These embodiments are described in the context of an inductive power supply, but are applicable where the magnet and shield are contained within the remote device. Although there may be variations in the components from embodiment to embodiment, to ease the description, similar reference numerals have been used to describe similar components. The magnets in the embodiments described provide a magnetic force for alignment of the inductive power supply and the remote device. The shield in these embodiments is configured to reduce the electromagnetic field that reaches the magnet during wireless power transfer from the inductive power supply to the remote device.

Figure 14:
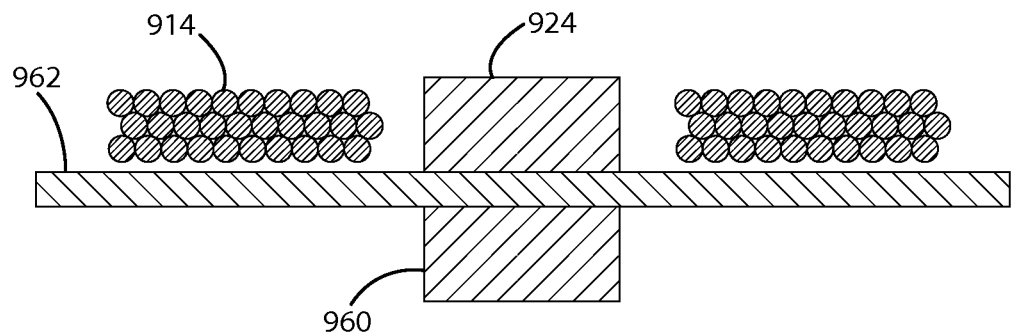
FIG. 14 is a cross sectional view showing an alternative embodiment of the present invention with a flush primary magnet and a shielded supplemental magnet.
Figure 15:
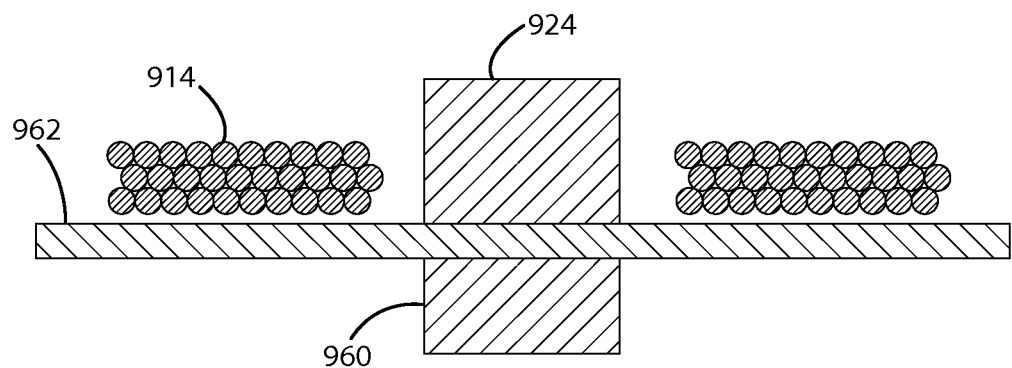
FIG. 15 is a cross sectional view showing an alternative embodiment of the present invention with an extended primary magnet and a shielded supplemental magnet.

Referring to FIGS. 14 and 15, alternative embodiments of the shielded supplemental magnet illustrated in FIGS. 5 and 6 are shown. In FIGS. 5 and 6, the supplemental magnet 60 is somewhat larger than the primary magnet 24. FIG. 14 illustrates that the supplemental magnet 960 and primary magnet 924 may be equal in size. Further, the FIG. 14 embodiment illustrates that the primary magnet may be flush with the surface of the coil 914. FIG. 15 illustrates that the primary magnet 924 may be larger than the supplemental magnet 960. Further, the FIG. 15 embodiment illustrates that the primary magnet may extend above the height of the coil 915. Although not depicted explicitly in this specific embodiment, the size, shape and height of the magnet may vary. The coil 914 and the shield 962 in these embodiments are positioned similarly and operate similarly as described above in connection with the FIGS. 5 and 6 embodiment.

Figure 16:
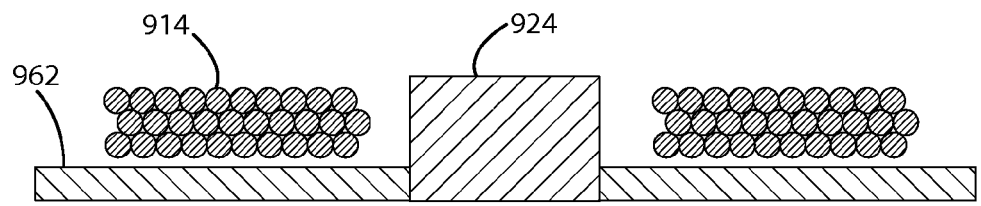
FIG. 16 is a cross sectional view showing an alternative embodiment of the present invention with a flush primary magnet seated in a shield.
Figure 17:
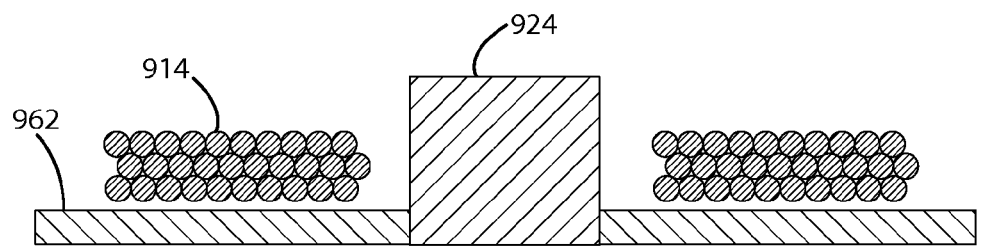
FIG. 17 is a cross sectional view showing an alternative embodiment of the present invention with an extended primary magnet seated in a shield.
Figure 18:
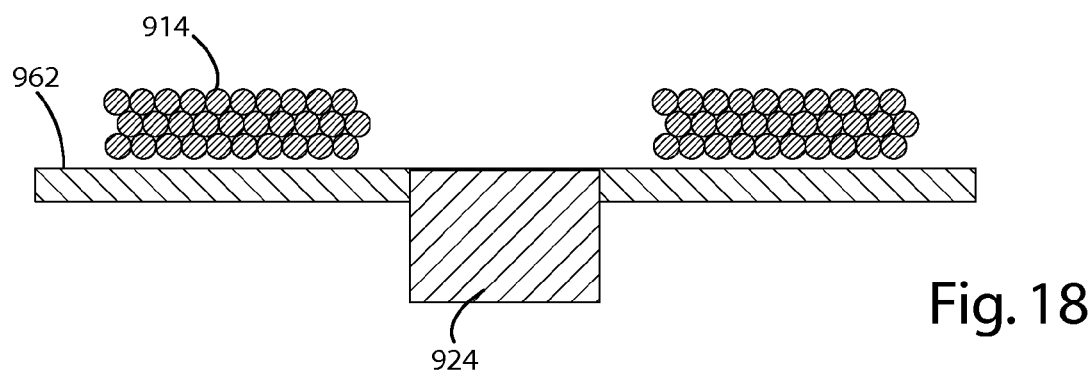
FIG. 18 is a cross sectional view showing an alternative embodiment of the present invention with a primary magnet recessed into a shield.
Figure 19:
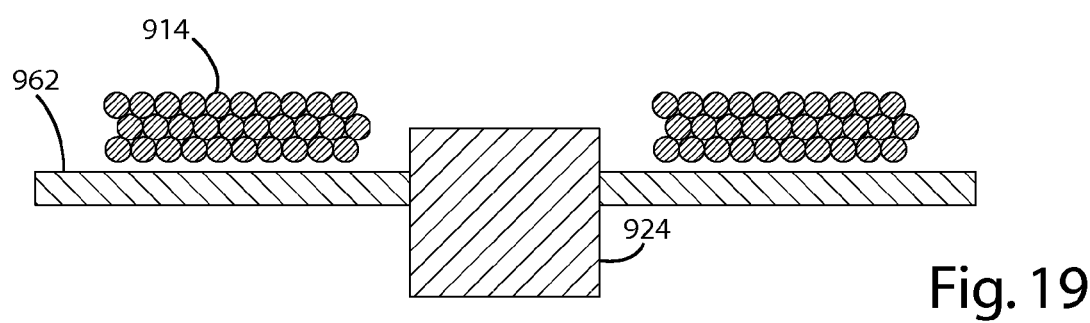
FIG. 19 is a cross sectional view showing an alternative embodiment of the present invention with a primary magnet partially recessed into a shield.

Referring to FIGS. 16-19, the depicted alternative embodiments includes a single magnet 924 disposed within a hole 925 of a shield 962. The magnet 924 may be flush with the shield and the surface of the coil 914, as shown in FIG. 16. The magnet 924 may be flush with the shield 962 and extend above the height of the coil 914, as shown in FIG. 17. One side of the magnet 924 may be flush with the shield 962 and the other side recessed into the shield as shown in FIG. 18. The magnet 924 may be partially recessed into the shield 962 as shown in FIG. 19. These illustrated embodiments of a magnet disposed within a shield are merely exemplary.

Figure 20:
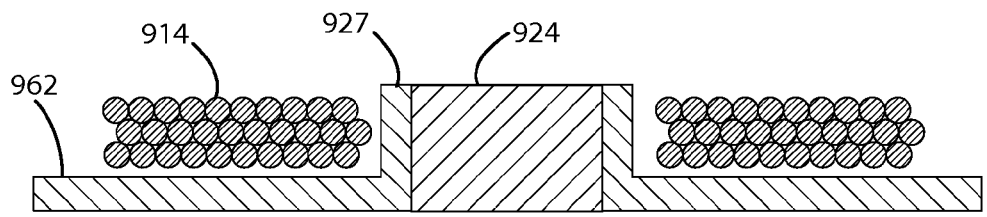
FIG. 20 is a cross sectional view showing an alternative embodiment of the present invention with a flush primary magnet disposed within a sleeve in a shield.

Referring to FIGS. 20-24, the depicted alternative embodiments include a single magnet 924 disposed within a sleeve 927 of a shield 962. The sleeve may be integrally formed with the shield or connected with the shield. The sleeve may be made of the same or a different material from the shield 962. Both sides of the magnet 924 may be flush with the sleeve 927 as shown in FIGS. 20-24. The magnet, sleeve, and surface of the coil 914 may all be flush as shown in FIG. 20.

Figure 21:
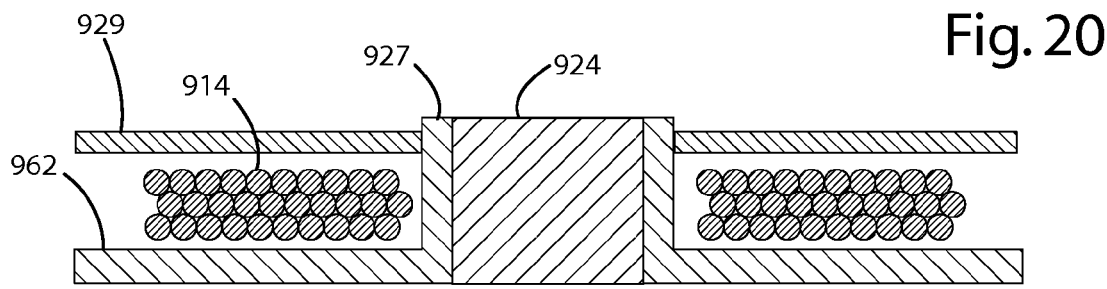
FIG. 21 is a cross sectional view showing an alternative embodiment of the present invention with an extended primary magnet disposed within a sleeve in a shield.

FIG. 21 is a cross sectional view showing an alternative embodiment of the present invention with an extended primary magnet 924 disposed within a sleeve 927 in a shield. The magnet 924 and sleeve 927 may both extend above the surface of the coil 914, as shown in FIG. 21. FIG. 21 includes a charging surface 929 where the sleeve 927 and the magnet 924 jut through the charging surface. This configuration allows the magnet 924 and shield or core 927 to protrude through a surface for additional tactile feedback. For example, smaller magnets may provide better electromagnetic coupling with this configuration. In alternative embodiments, the charging surface may be flush with one or both of the sleeve and magnet or the sleeve and magnet may be below the charging surface.

Figure 22:
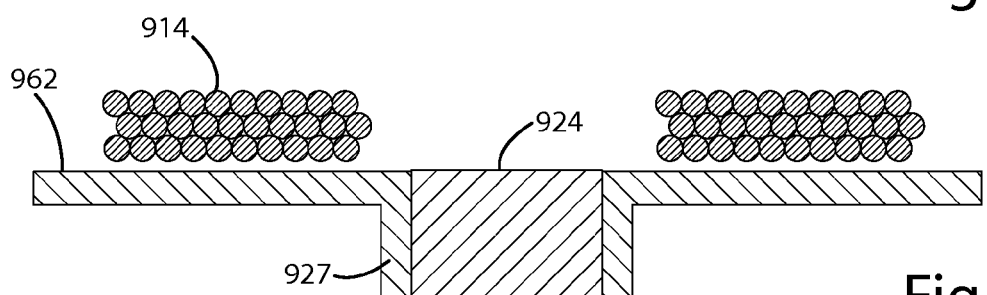
FIG. 22 is a cross sectional view showing an alternative embodiment of the present invention with a primary magnet disposed within a recessed sleeve in a shield.
Figure 23:
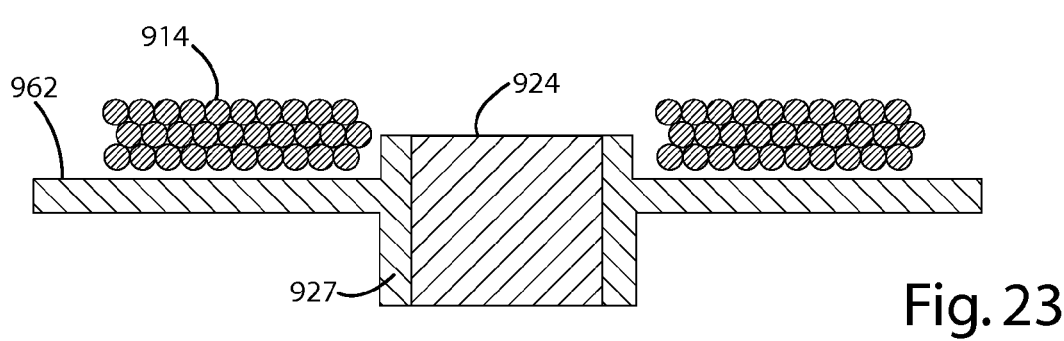
FIG. 23 is a cross sectional view showing an alternative embodiment of the present invention with a primary magnet disposed within a partially recessed sleeve in a shield.

Referring to FIG. 22, one side of the magnet 924 and sleeve 927 may be flush with the shield 962 and the other side of the magnet 924 and the sleeve 927 may be recessed into the shield 927. The magnet 924 and sleeve 927 may be partially recessed into the shield 962 as shown in FIG. 23. Alternatively, one or both sides of the magnet may extend above or below the sleeve.

Figure 24:
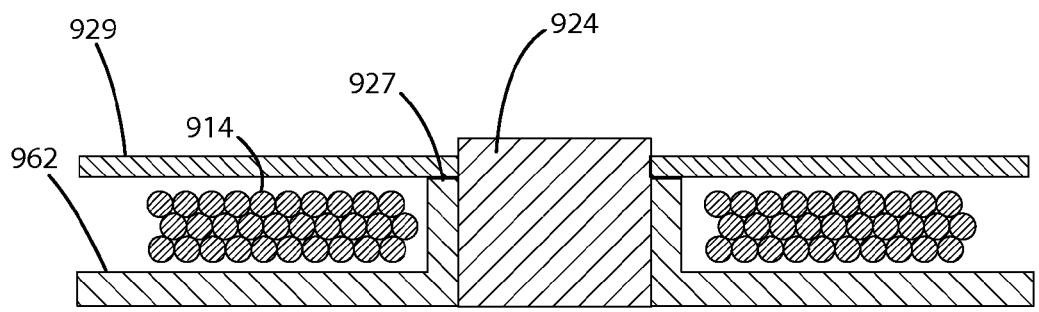
FIG. 24 is a cross sectional view showing an alternative embodiment of the present invention with a primary magnet partially disposed within a sleeve in a shield.

FIG. 24 is a cross sectional view showing an alternative embodiment of the present invention with a primary magnet 924 partially disposed within a sleeve 927 in a shield. That is, one side of the magnet 924 may be flush with the sleeve 927 and the other side of the magnet 924 may extend above the sleeve 927 as shown in FIG. 24. FIG. 24 includes a charging surface 929 with a hole where the magnet 924 juts through the hole in the charging surface 929. This configuration allows the magnet 924 to protrude through a surface for additional tactile feedback. For example, smaller magnets may provide electromagnetic coupling with this configuration.

Figure 25:
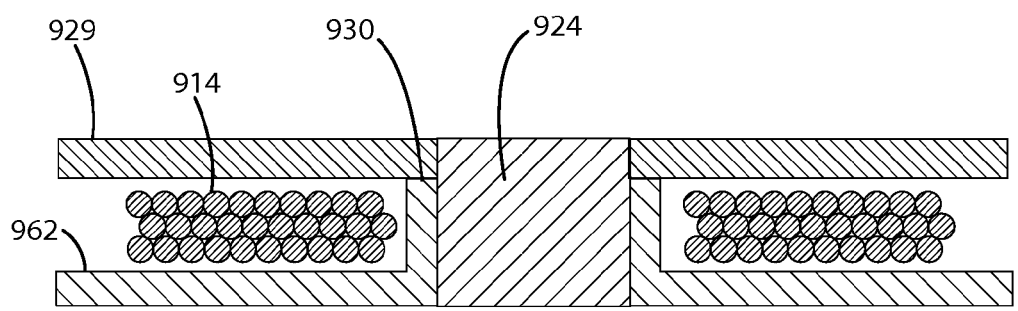
FIG. 25 is a cross sectional view similar to FIG. 24 showing the unshielded portion of the primary magnet extending through a charging surface.
Figure 26:
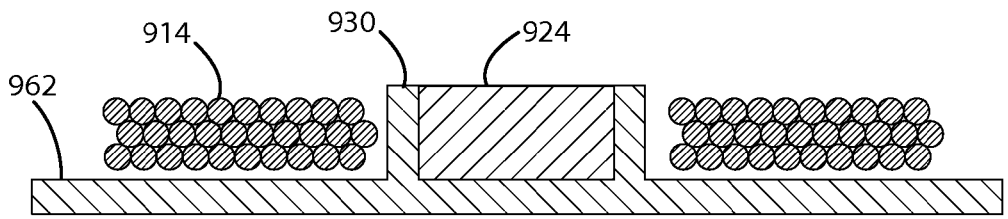
FIG. 26 is a cross sectional view showing an alternative embodiment of the present invention with a flush primary magnet disposed within a cavity in a shield.
Figure 27:
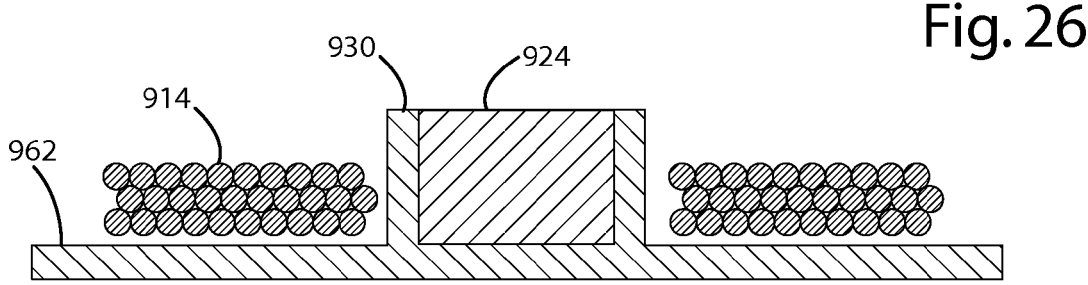
FIG. 27 is a cross sectional view showing an alternative embodiment of the present invention with an extended primary magnet disposed within a cavity in a shield.
Figure 28:
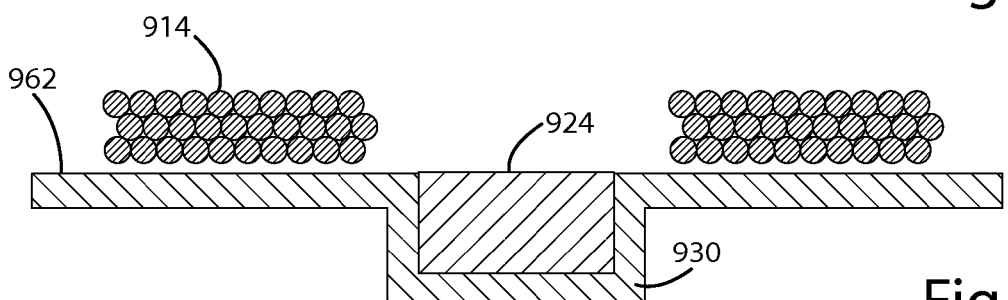
FIG. 28 is a cross sectional view showing an alternative embodiment of the present invention with a flush primary magnet disposed within a recessed cavity in a shield.
Figure 29:
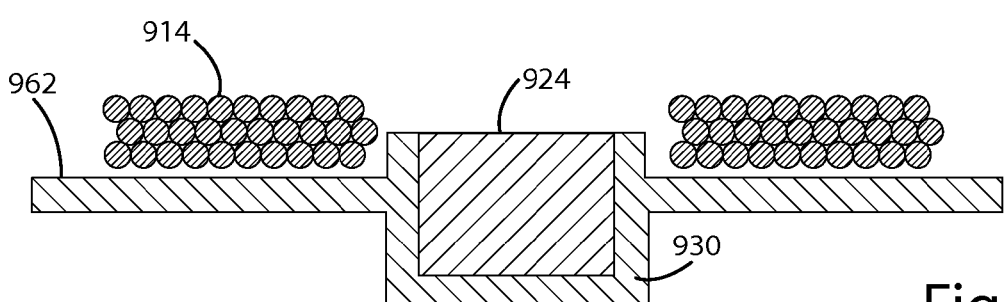
FIG. 29 is a cross sectional view showing an alternative embodiment of the present invention with an extended primary magnet disposed within a partially recessed cavity in a shield.
Figure 30:
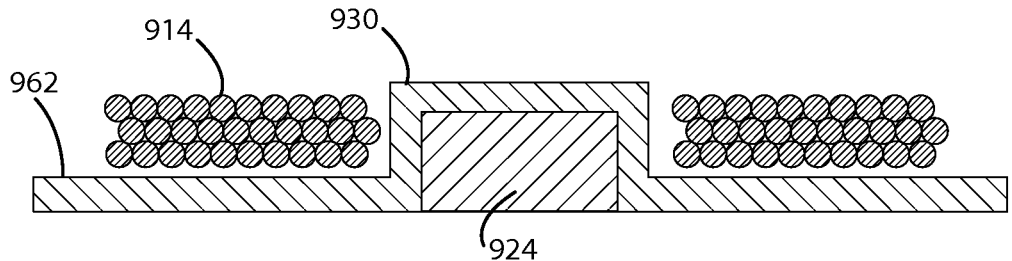
FIG. 30 is a cross sectional view showing an alternative embodiment of the present invention with a flush primary magnet disposed within an inverted cavity in a shield.
Figure 31:
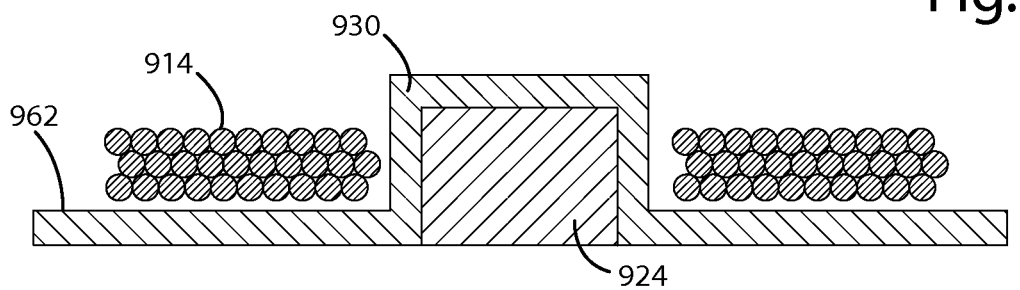
FIG. 31 is a cross sectional view showing an alternative embodiment of the present invention with an extended primary magnet disposed within an inverted cavity in a shield.
Figure 32:
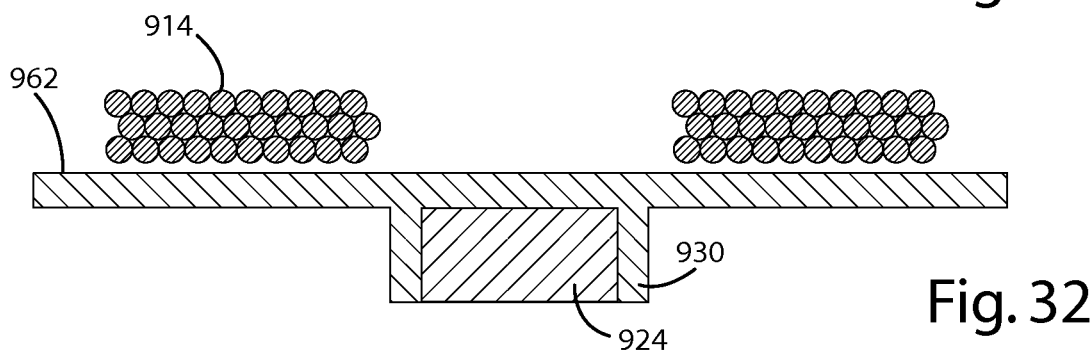
FIG. 32 is a cross sectional view showing an alternative embodiment of the present invention with a primary magnet disposed within an inverted, recessed cavity in a shield.
Figure 33:
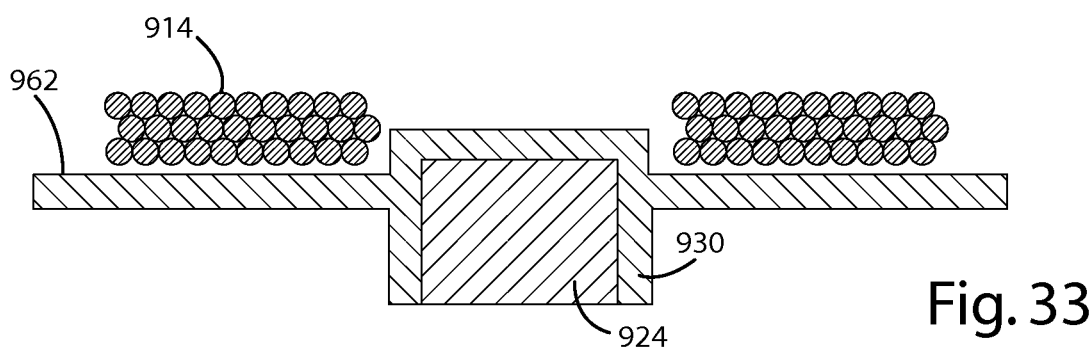
FIG. 33 is a cross sectional view showing an alternative embodiment of the present invention with a primary magnet disposed within an inverted, partially recessed cavity in a shield.

Referring to FIGS. 25-33, the depicted alternative embodiments include a single magnet 924 disposed within a cavity 930 of a shield 962. The cavity may be integrally formed with the shield or a separate piece connected to the shield 962. The cavity may be made of the same or a different material from the shield 962. One side of the magnet 924 may be seated within the cavity 930 and the other side of the magnet 924 may extend above the cavity 930 such that the side is flush with a charging surface 929, as shown in FIG. 25. Although the charging surface is not shown in the other alternative embodiments, one may be included and the magnet, shield, sleeve, may be aligned above or below the charging surface or flush with the charging surface. One side of the magnet may be seated within the cavity 930 and the other side of the magnet 924, cavity 930, and the surface of the coil 914 may all be flush with each other, as shown in FIG. 26. One side of the magnet and cavity 930 may be flush with each other but extend above the height of the surface of the coil 914, as shown in FIG. 27. One side of the magnet 924 may be flush with the shield while the shield is seated in the cavity 930, as shown in FIG. 28. The magnet 924 may be seated flush within a partially recessed cavity 930, as shown in FIG. 29. The magnet 924 may be seated flush within an inverted cavity 930 where the inverted cavity is flush with the surface of the coil 914, as shown in FIG. 30. The magnet 924 may be seated flush within an inverted cavity 930 where the inverted cavity extends above the surface of the coil 914, as shown in FIG. 31. The inverted cavity 930 may be recessed beneath the shield 962, as shown in FIG. 32. The inverted cavity 930 may be partially recessed, as shown in FIG. 33.

Although the charging surface 929 is only illustrated in a few of the figures to make understanding the positional relationships between the various elements easier, it is to be understood that the charging surface may be included in these various embodiments in a variety of different locations and may have a variety of different characteristics as discussed above with reference to the other embodiments.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A magnetic positioning system for use in an inductive power supply system for wirelessly transferring power from an inductive power supply to a remote device using an electromagnetic field, said magnetic positioning system comprising:

at least one of the inductive power supply and the remote device including a plurality of magnets disposed about a coil;

the other one of the inductive power supply and the remote device including a first magnet and a second magnet;

wherein said plurality of magnets, said first magnet, and said second magnet provide magnetic force for alignment of the inductive power supply and the remote device into a plurality of different orientations about said coil, wherein, in each of said plurality of different orientations, said plurality of magnets and said first magnet align the remote device and the inductive power supply in a position about said coil such that the inductive power supply and the remote device are aligned for wireless power transfer from said coil;

a sensor located in at least one of the inductive power supply and the remote device, wherein said sensor is configured to provide sensor output including sensed information related to a magnetic field proximate to the inductive power supply and the remote device, wherein said second magnet is positioned relative to said first magnet and said plurality of magnets such that said second magnet provides an asymmetric effect on the magnetic field proximate to the inductive power supply and the remote device, wherein said sensor output is indicative of said asymmetric effect of said index magnet on the magnetic field, wherein said sensor output enables said magnetic positioning system to differentiate, based on said asymmetric effect of said second magnet, between said plurality of different orientations about said coil and at which the inductive power supply and the remote device are aligned for wireless power transfer from said coil; and a controller located in at least one of the inductive power supply and the remote device, wherein said controller is in communication with said sensor, said controller determines, based on said sensor output indicative of said asymmetric effect of said second magnet, an orientation of the remote device from among said plurality of orientations at which the inductive power supply and the remote device are aligned for wireless power transfer, said controller programmed to provide an input as a function of said determined orientation of the remote device.

2. The magnetic positioning system of claim 1 wherein said controller is programmed to determine whether to operate a display on the remote device in at least one of portrait and landscape mode as a function of said determined orientation.

3. The magnetic positioning system of claim 1 wherein said second magnet is substantially aligned magnetically and coaxially with at least one of said plurality of magnets to provide magnetic force for alignment of the inductive power supply and the remote device.

4. The magnetic positioning system of claim 1 wherein said controller is programmed to determine rotational motion of the remote device with respect to the inductive power supply as a function of said sensor output.

5. The magnetic positioning system of claim 1 wherein said controller is programmed to determine a direction of rotation of the remote device as a function of said sensor output.

6. The magnetic positioning system of claim 1 wherein said input is at least one of a volume control input and a brightness control input for the remote device.

7. The magnetic positioning system of claim 1 wherein said sensor includes a hall effect sensor.

8. The magnetic positioning system of claim 1, wherein the second magnet is an index magnet, and wherein said index magnet provides a reference to assist in differentiating between said plurality of different orientations.

9. The magnetic positioning system of claim 8 wherein the other of the inductive power supply and the remote device includes said first magnet and at least one additional magnet.

10. A magnetic positioning system for use in an inductive power supply system for wirelessly transferring power from an inductive power supply to a remote device using an electromagnetic field, said magnetic positioning system comprising:
 at least one of the inductive power supply and the remote device including a plurality of magnets that cooperate with a magnetic element in the other one of the inductive power supply and the remote device, wherein said plurality of magnets are configured to cooperate with the magnetic element to provide magnetic force for alignment of the inductive power supply and the remote device into a plurality of different orientations about a primary for transfer of wireless power, wherein, in each of said plurality of different orientations, said plurality of magnets and the magnetic element align the remote device and the inductive power supply in a position about said primary such that the inductive power supply and the remote device are aligned for wireless power transfer from said primary;
 an index magnet located in at least one of the inductive power supply and the remote device, wherein said index magnet provides a reference to assist in differentiating between said plurality of different orientations, wherein, in cooperation with said plurality of magnets, said index magnet provides magnetic force for alignment of the inductive power supply and the remote device;
 a sensor located in at least one of the inductive power supply and the remote device, wherein said sensor is configured to provide sensor output including sensed information related to a magnetic field proximate to the inductive power supply and the remote device, wherein said index magnet is positioned relative to said magnetic element and said plurality of magnets such that said index magnet provides an asymmetric effect on the magnetic field proximate to the inductive power supply and the remote device, wherein said sensor output is indicative of said asymmetric effect of said index magnet on the magnetic field, wherein said sensor output enables said magnetic positioning system to differentiate, based on said asymmetric effect of said index magnet, between said plurality of different orientations, wherein in each of said plurality of different orientations, the remote device and the inductive power supply are aligned for transfer of wireless power from said primary; and
 a controller located in at least one of the inductive power supply and the remote device, wherein said controller is in communication with said sensor, said controller determines, based on said sensor output indicative of said asymmetric effect of said index magnet on the magnetic field, an orientation of the remote device from among said plurality of orientations at which the inductive power supply and the remote device are aligned for wireless power transfer, said controller programmed to provide an input as a function of said determined orientation of the remote device.

11. The magnetic positioning system of claim 10 wherein said plurality of magnets includes said index magnet.

12. The magnetic positioning system of claim 10 wherein a magnet layout of said plurality of magnets located in the inductive power supply is asymmetric, wherein said magnet layout assists in differentiating between said plurality of different orientations of the remote device.

13. The magnetic positioning system of claim 10 wherein said controller is programmed to determine whether to operate a display on the remote device in at least one of portrait and landscape mode as a function of said determined orientation.

14. The magnetic positioning system of claim 10 wherein said index magnet is substantially aligned magnetically and coaxially with at least one of said plurality of magnets to provide magnetic force for alignment of the inductive power supply and the remote device.

15. The magnetic positioning system of claim 10 wherein the magnetic element includes a second plurality of magnets, wherein at least one of said second plurality of magnets is configured to provide magnetic force for alignment of said inductive power supply and said remote device in said plurality of different orientations.

* * * * *